United States Patent [19]

Brighton

[11] Patent Number: 5,065,691
[45] Date of Patent: Nov. 19, 1991

[54] FLUID FLOW INDICATOR

[76] Inventor: Jack E. Brighton, 15460 Cadmus Rd., Hudson, Mich. 49247

[21] Appl. No.: 600,666
[22] Filed: Oct. 22, 1990
[51] Int. Cl.⁵ ............................................. G01P 13/00
[52] U.S. Cl. .................................... 116/274; 116/276
[58] Field of Search ......................... 116/264, 273-276

[56] References Cited

U.S. PATENT DOCUMENTS

| 799,603 | 9/1905 | King | 116/274 |
|---|---|---|---|
| 1,385,973 | 7/1921 | Brown | 116/274 |
| 1,449,217 | 3/1923 | Davis | 116/274 |
| 1,756,491 | 4/1930 | Marsh | 116/274 |
| 2,027,696 | 1/1936 | Morgan | 116/274 |
| 2,139,148 | 12/1938 | Brouse | 116/274 |
| 2,660,144 | 11/1953 | Newcum | 116/275 |
| 2,691,955 | 10/1954 | Pacey | 116/274 |
| 4,080,925 | 3/1978 | Moore | 116/264 X |

FOREIGN PATENT DOCUMENTS 0129719 7/1919 United Kingdom ................ 116/274

Primary Examiner—William A. Cuchlinski, Jr.
Assistant Examiner—W. Morris Worth
Attorney, Agent, or Firm—Beaman & Beaman

[57] ABSTRACT

A fluid flow indicator for use with light transmitting conduits having end fittings which include a bore. The flow indicator includes a base defined by a coiled wire closely received within the fitting bore and an axially extending indicator support which extends from the base into the conduit includes a rotatable flag whose rotation can be exteriorly observed or sensed as fluid flow occurs. The coiled wire base includes an abutment engaging with fitting structure for axially positioning the indicator relative to the fitting and conduit.

4 Claims, 1 Drawing Sheet

FLUID FLOW INDICATOR

BACKGROUND OF THE INVENTION

In many conduit systems it is desired that fluid flow through the conduits be indicated, and a variety of devices have been devised for achieving this purpose. U.S. Pat. Nos. 799,603; 1,449,217; 1,756,491 and 2,691,955 show typical approaches to flow indicators.

In the past, conduit and plumbing fixtures utilizing flow indicators were necessarily of special construction and usually required that the conduit system include a special fixture having a window formed therein for the purpose of observing the flow indicator. Such special purpose fittings are expensive and bulky, and situations often exist where a flow indicator is desired, but space limitations prevent the installation of conventional flow indicators.

Popular heating systems for dwellings utilizing radiant heat employ a plurality of conduits conveying hot water which are imbedded in the dwelling floor or ceiling, often encased in the concrete forming the floor. Such heating systems require a plurality of circuits, and when balancing the circuits to closely control the flow of water through each circuit for comfort control the flow rate through each circuit is critical. The greater the flow, the hotter the particular circuit and temperature balancing can only be achieved by time consuming trial and error.

Radiant heating systems using imbedded conduits may employ conduits formed of synthetic plastic material which is transparent or translucent, such as those sold by the Wirsbo Company of Apple Valley, Minn., and it is an object of the invention to provide an inexpensive fluid flow indicator which may be used with light transmitting conduits and conventional conduit system fittings without requiring any modification to the conduit system, the conduits, or its end fittings.

Another object of the invention is to provide a fluid flow indicator of concise configuration which is inexpensive to manufacture, may be installed without special skills, and does not adversely affect the sealing characteristics of the conduit system when installed.

An additional object of the invention is to provide a fluid flow indicator which visually indicates the rate of fluid flow through a light transmitting conduit wherein the rate of rotation of the rotatable indicator flag will directly indicate the rate of fluid flow within the conduit.

Yet another object of the invention is to provide a fluid flow indicator capable of being inserted into a conventional conduit and conduit fitting without modification thereto and wherein the indicator will be positively retained against axial movement and will not jeopardize the other components of the fluid system.

In the practice of the invention the fluid flow indicator is used in conjunction with light transmitting conduits attached to an adapter by means of a conventional compression nut, ferrule and end fitting. The fluid flow indicator is primarily formed of a spiraled wire having a base portion closely received within the conduit fitting bore, and a rotatable flag extends from the base into the light transmitting portion of the conduit as to be exteriorly visible.

The indicator base is formed of a coiled wire, and at one end an enlarged coil engages with the conduit fitting and the associated adapter to axially position the indicator with respect to the associated conduit system.

A fluid flow indicator in accord with the invention can be very easily installed into a conventional fluid circuit by merely inserting the indicator into the end of the conduit fitting prior to assembling the conduit and conduit fitting to a manifold adapter. After the indicator is inserted into the conduit fitting the conduit and conduit fitting are connected to the adapter in the normal manner and once the completion of the fitting and adapter connection is finalized the positioning of the flow indicator is also achieved.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
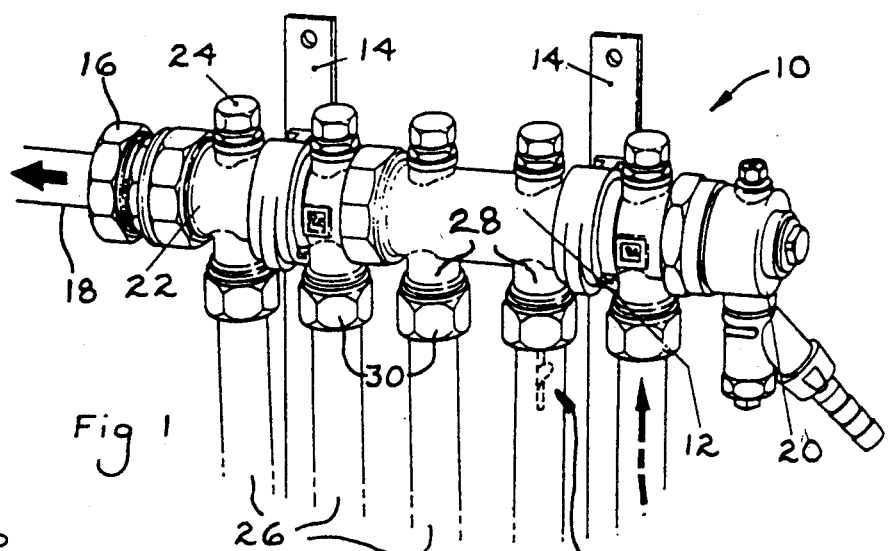
FIG. 1 is a perspective view of a manifold of a fluid circuit utilizing the fluid flow indicator of the invention.

A typical use of the invention is shown in FIG. 1 wherein a manifold apparatus is disclosed utilizing a plurality of translucent conduits. Such a manifold is commonly used in hot water radiant heating systems, such as those installed by Wirsbo Company of Apple Valley, Minn. The disclosed apparatus includes a manifold 10 having a generally cylindrical body 12 formed of a plurality of interconnected parts. The body 12 may be supported upon brackets 14. The manifold 10 includes an outlet 16 associated with the outlet conduit 18 having flow therethrough as indicated by the arrow. An end cap 20 is connected to the other end of the manifold 10 and the manifold may consist of a plurality of interconnected parts such as represented at 22.

Valves 24 are defined in the manifold 10 and are diametrically opposed to the translucent synthetic plastic conduits 26 which are connected to the manifold adapters 28 associated with compression nuts 30 whereby the conduits 26 may be sealingly connected to the manifold 10, as will be later described. It is to be understood that the particular construction of the manifold constitutes no part of the present invention but is only illustrated as indicating a typical use of the fluid flow indicator of the invention.

Figures 2, 3:
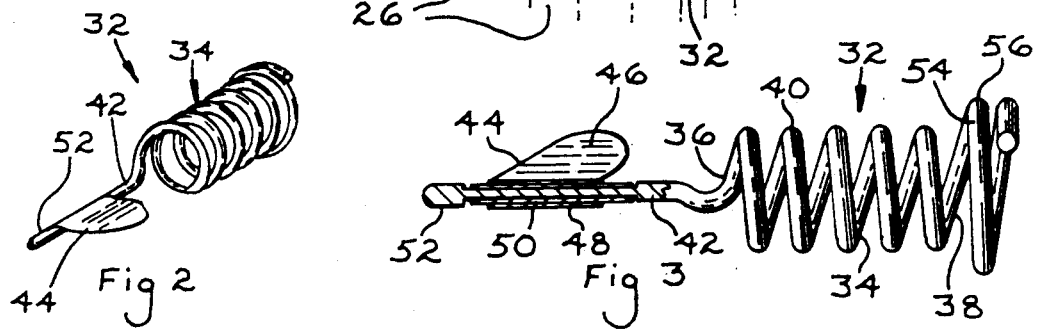
FIG. 2 is a perspective view of the fluid flow indicator, per se.
FIG. 3 is an enlarged elevational view, partially sectioned, of the fluid flow indicator.

The fluid flow indicator is generally represented at 32 and includes a base 34 of a cylindrical configuration formed of a spiralled wire. The base 34 includes a left end 36, FIG. 3, and a right end 38, and the outer diameter or dimension of the base 34 is represented at 40.

The indicator or flag support 42 constitutes an extension of the wire forming the base 34 and end 36 and is coaxially related to the axis of the base 34. The support 42 is of a linear configuration and has a reduced intermediate diameter so as to rotatably receive the flag 44. The flag 44 is of a spiralled blade like configuration having an oblique surface 46 which is oblique to the axis of the support 42, and the flag also includes a hub having a bore 48 wherein the hub circumscribes the support 42 and the cylindrical bearing 50 defined thereon. In this manner the flag 44 is freely rotatable upon the support 42. The outer end of the support 42 is enlarged as at 52 to maintain the flag on the support, and it is to be understood that various fabricating techniques may be used to affix the enlarged end 52 to the support 42.

Adjacent the base end 38 an abutment coil 54 is defined of the same wire as forms the base 34. The abutment coil 54 defines a diameter 56 which is of a greater dimension than the base diameter 40.

Figure 4:
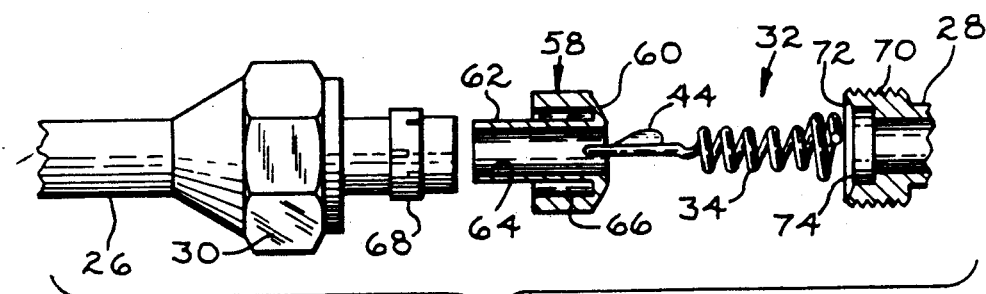
FIG. 4 is an elevational exploded view of the conduit end fitting, adapter and fluid flow indicator, partially sectioned, prior to assembly.
Figure 5:
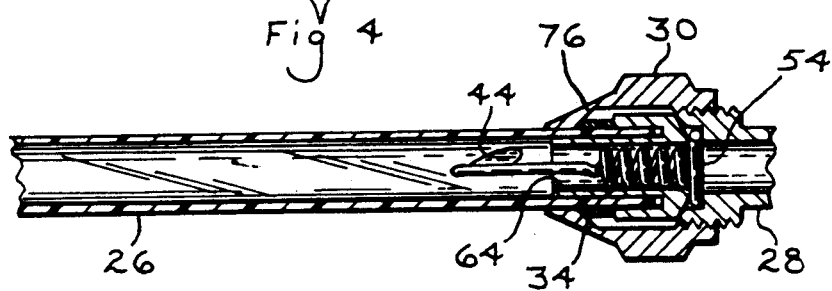
FIG. 5 is an elevational, diametrical, sectional view of the conduit, end fitting, adapter and flow indicator fully assembled.

With reference to FIG. 4, the end fitting body typically associated with the conduits 26 is represented at 58 and is of a generally cylindrical form having a tapered sealing surface 60. The end fitting 58 also includes a cylindrical nipple 62 adapted to be closely inserted within the bore of the conduit 26, and the nipple includes a cylindrical bore 64. The body also is formed with an annular recess 66 for receiving the end of the conduit 26 as will be appreciated from FIG. 5.

A radially compressible ferrule 68 surrounds the conduit 26, and as will be later described, is axially compressed between the end fitting body 58 and the compression nut 30.

The adapters 28 formed on the manifold 10 each include a bore communicating with the interior of the manifold, and threads 70 formed on the adapters selectively cooperate with the threads of the compression nut 30. The adapter also includes an oblique sealing surface 72 for cooperating with the end fitting sealing surface 60, and the adapter is recessed at 74 defining a radial shoulder.

When using the fluid flow indicator of the invention the initial assembly of the components on a conduit 26 is conventional. The compression nut 30 is inserted over the end of the conduit 26, and the ferrule 68 is also placed over the conduit end. Thereupon, the end fitting body 58 is axially aligned with the end of the conduit and the nipple 62 is inserted into the conduit bore until the conduit end is received within recess 66. At this time the fluid flow indicator 32 is coaxially aligned with the end fitting body in a manner as illustrated in FIG. 4, and the support 42 and flag 44 are inserted into the end fitting bore 64. As the diameter 40 of the base 34 is slightly less than the diameter of bore 64 the base 34 is readily received within the end fitting body bore 64 as will be apparent from FIG. 5. Insertion of the base 34 into the bore 64 continues until the abutment coil 54 engages the end fitting body.

With the fluid flow indicator 32 assembled in the end of the end fitting body as described above, the conduit 26 is aligned with the adapter 28 and the compression nut 30 is threaded upon the adapter threads 70 in the usual manner. This operation causes the tapered cam surface 76 within the compression nut to engage the outer end of the ferrule 68 radially contracting the ferrule on the conduit 26, and simultaneously, the end fitting seal surface 60 engages and seals against the adapter seal surface 72. As will be apparent in FIG. 5, the abutment coil 54 is received within the adapter countersunk portion 74 and engages the radial shoulder thereof. Thus, tightening of the nut 30 on the adapter axially locates the abutment coil 54 between the adapter and end fitting and retains the flow indicator 32 against axial displacement within the conduit or adapter.

The flag support 42 is of sufficient length to position the flag 44 within the conduit 26 at a location which is beyond the configuration of the compression nut 30. Thus, as fluid flow through the conduit 26 occurs from left to right, FIG. 5, the flag 44 will rotate as the flowing fluid engages the flag oblique drive surface 46. If the conduit 26 is transparent the flag, which may be brightly colored, can be readily observed, and its rate of rotation noted. Adjustment of the valves 24 permit the rate of flow through the various conduits 26 communicating with the manifold 10 to be adjusted, and the indicator very quickly permits a radiant heating system using a manifold 10 to be balanced.

If the conduits 26 are formed of a translucent synthetic plastic material, rather than a transparent material, the placing of a light, such as a flashlight, on the opposite side of the conduit from which the conduit is viewed permits the rotation of the flag to be observed. It will also be appreciated that the rotation of the flag 44 could be sensed electronically, such as by a Hall effect circuit, held close to the flag.

As the fluid flow indicator of the invention is primarily formed of a coiled wire it will be appreciated that the indicator may be very economically manufactured, with few components which makes the indicator dependable in operation and unlikely to accidentally disassemble and adversely affect the components of the fluid circuit associated therewith, and the concise configuration eliminates the need for special fittings.

It will be appreciated that various modifications to the inventive concepts may be apparent to those skilled in the art without departing from the spirit and scope of the invention.

What is claimed is:

1. A fluid flow indicator for use with a light transmitting conduit having an end fitting having a cylindrical bore and an end releasably interconnected with an adapter comprising, in combination, a base having a longitudinal axis and first and second ends, a passage defined through said base between said ends, said base having a cylindrical exterior surface of a diameter closely receivable within the fitting bore, an elongated indicator support axially extending from said base first end a sufficient distance to be located within the light transmitting conduit, a flow indicator flag rotatably mounted on said support having a drive surface obliquely related to said axis whereby fluid flow through the conduit rotates said flag, and an abutment defined on said base adjacent said base second end engaging the adapter and fitting end to axially locate and maintain said base relative to the fitting.

2. In a fluid flow indicator as in claim 1, said base comprising a helical wire coil and the exterior dimension of said coil comprising said cylindrical exterior surface.

3. In a fluid flow indicator as in claim 2, said indicator support comprising an extension of the wire defining said coil.

4. In a fluid flow indicator as in claim 1, said abutment comprising a wire coil defined on said base second end of a diameter greater than the diameter of said cylindrical exterior surface.

* * * * *